United States Patent
Wakai

(10) Patent No.: US 6,565,447 B2
(45) Date of Patent: May 20, 2003

(54) METHOD FOR MANUFACTURING NAILS

(75) Inventor: Takao Wakai, Osaka (JP)

(73) Assignee: Wakai & Co., Ltd., Osaka (JP)

( * ) Notice: Subject to any disclaimer, the term of this patent is extended or adjusted under 35 U.S.C. 154(b) by 29 days.

(21) Appl. No.: 09/900,170

(22) Filed: Jul. 9, 2001

(65) Prior Publication Data

US 2001/0041109 A1 Nov. 15, 2001

Related U.S. Application Data

(62) Division of application No. 09/626,121, filed on Jul. 26, 2000, now abandoned.

(30) Foreign Application Priority Data

Nov. 26, 1999 (JP) ............................................. 11-336153

(51) Int. Cl.⁷ ................................................ B21G 3/00
(52) U.S. Cl. ............................................ 470/34; 470/40
(58) Field of Search ............................. 470/27, 34, 38, 470/39, 40; 411/78, 79, 80

(56) References Cited

U.S. PATENT DOCUMENTS

| | | | |
|---|---|---|---|
| 2,014,746 A | * | 9/1935 | Robergel ..................... 470/34 |
| 4,797,046 A | | 1/1989 | Olivier et al. |
| 4,892,450 A | | 1/1990 | Gerhard |
| 5,468,107 A | | 11/1995 | Wakai |
| 5,700,119 A | | 12/1997 | Wakai |

FOREIGN PATENT DOCUMENTS

| | | | | |
|---|---|---|---|---|
| JP | 4-333337 | * | 11/1992 | ................... 470/34 |
| JP | 7-103216 | * | 4/1995 | ................... 470/34 |

* cited by examiner

Primary Examiner—Ed Tolan
(74) Attorney, Agent, or Firm—Wenderoth, Lind & Ponack, L.L.P.

(57) ABSTRACT

A method for manufacturing a nail efficiently at low cost without a loss of material. The nail includes two legs bound together by a washer. One of the legs has a protrusion such that when the other leg is driven, it will spread by riding on the protrusion. In this method, a round rod stock is pressed except a portion thereof to form a head at one thereof, a trunk portion having a semicircular section with a flat surface between the head and the portion, and a tip portion at the other end of the rod stock. The portion forms the protrusion. The one of the legs is thus formed. The protrusion may be formed by pressing the rod from both sides.

23 Claims, 3 Drawing Sheets

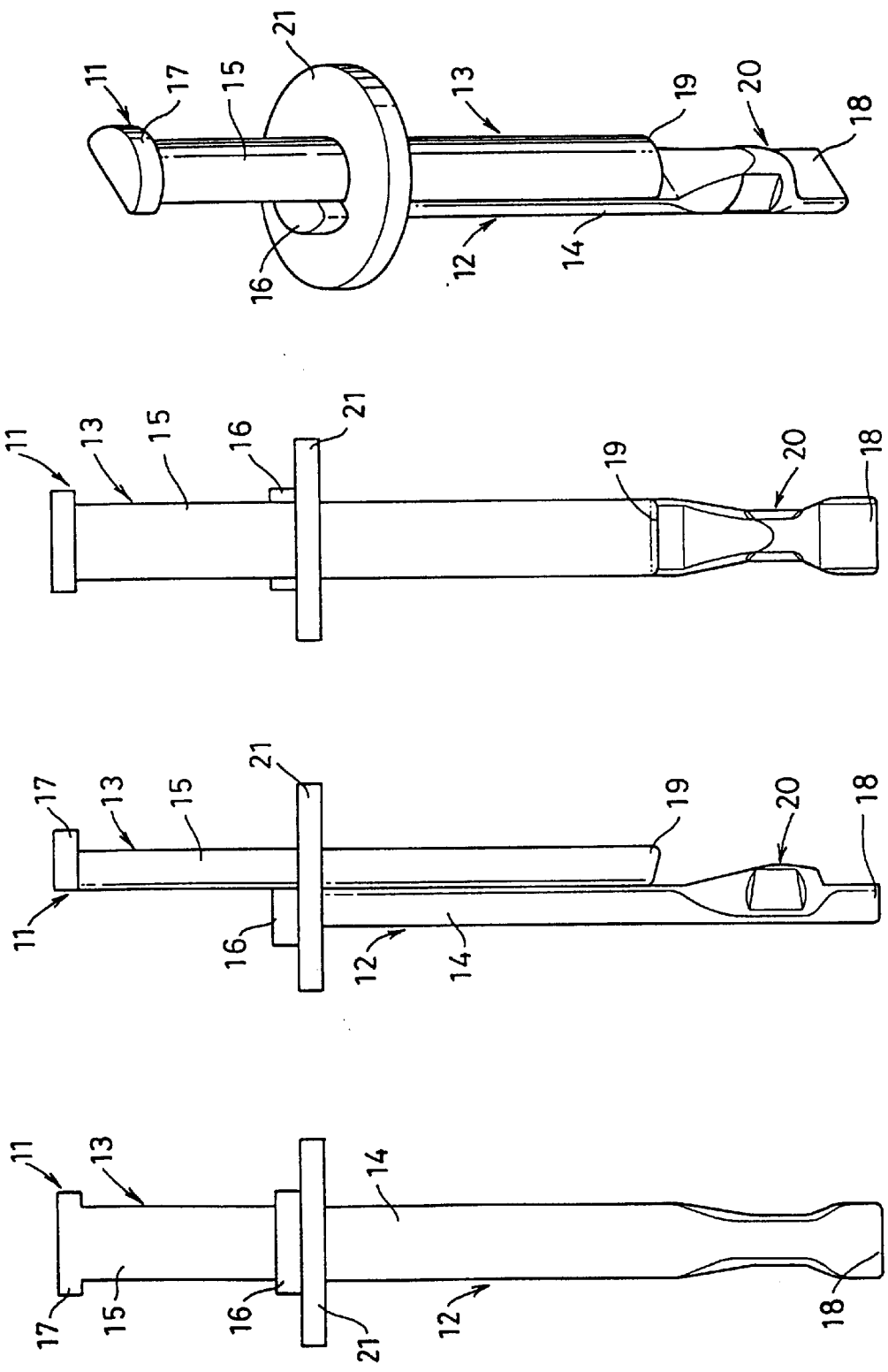

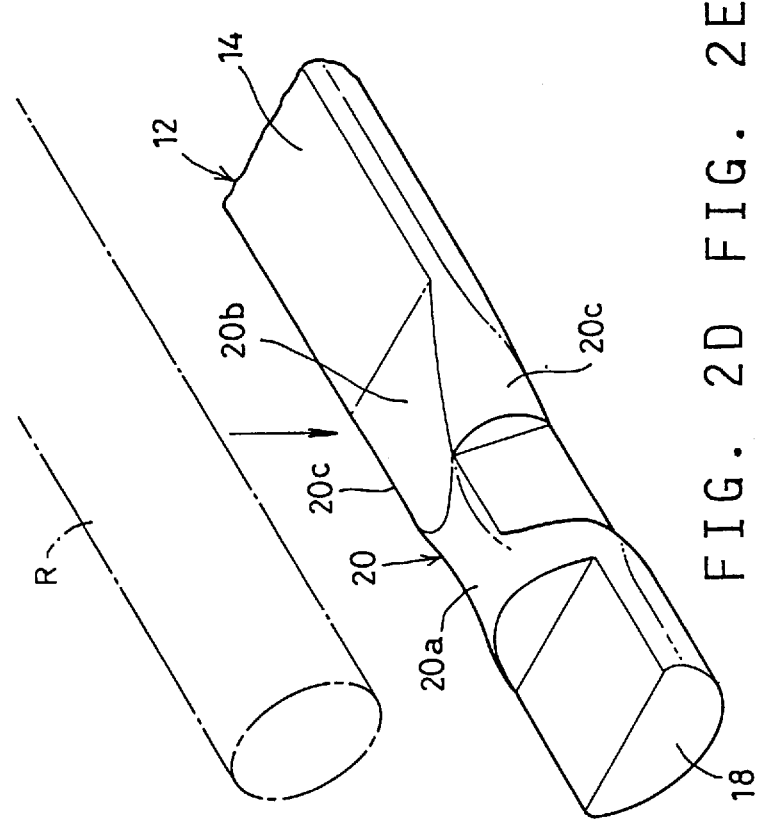
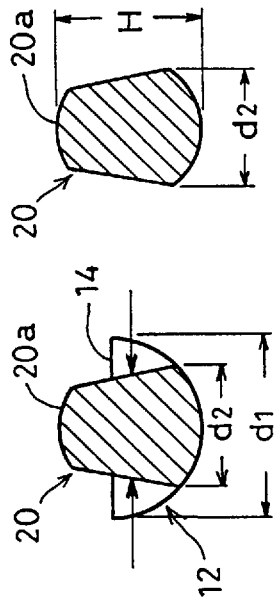
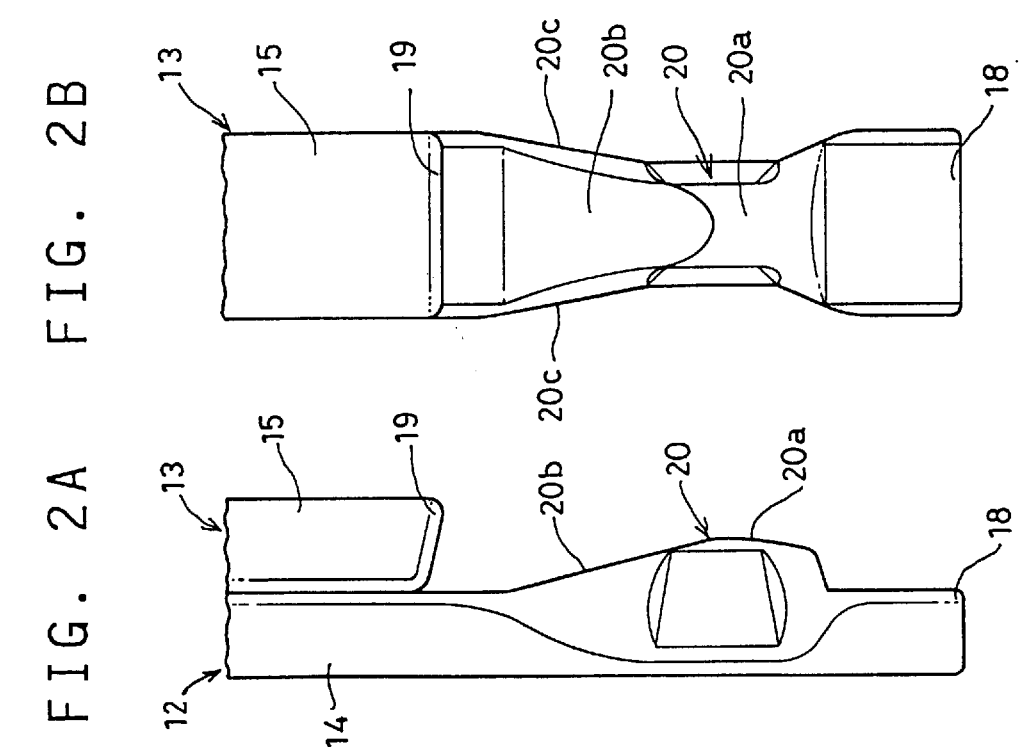

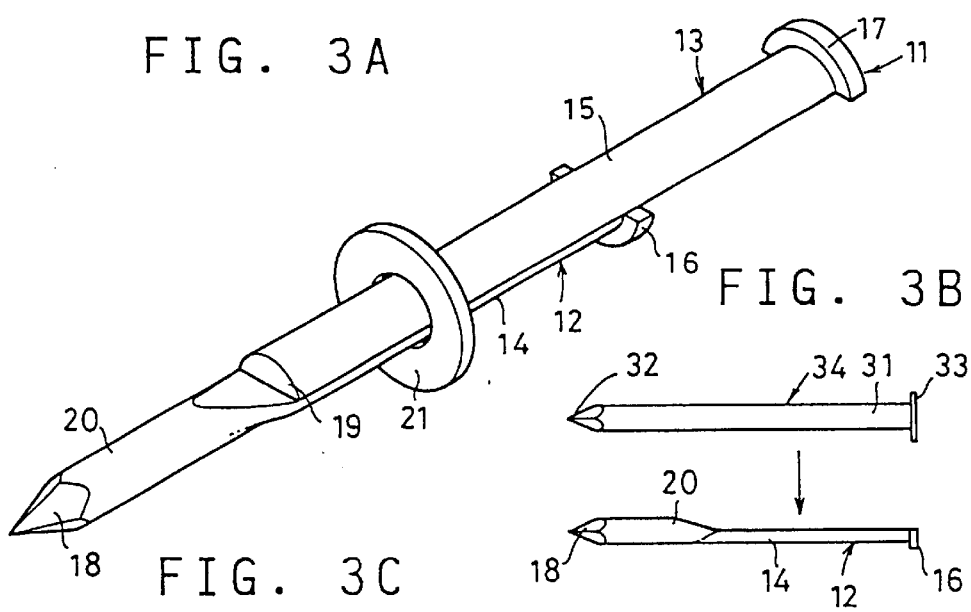
FIG. 3A
FIG. 3B
FIG. 3C
FIG. 3D
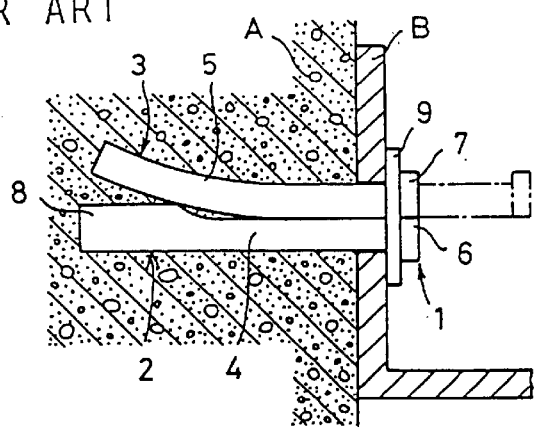
FIG. 4A
PRIOR ART
FIG. 4B
PRIOR ART

METHOD FOR MANUFACTURING NAILS

This application is a divisional application of application Ser. No. 09/626,121, filed Jul. 26, 2000 now abandoned.

BACKGROUND OF THE INVENTION

The invention relates to nails with spreadable legs used to fasten various objects to ALC (autoclaved light-weight concrete) or concrete walls or blocks, and to a method for manufacturing the same.

FIGS. 4A and 4B show a conventional nail.

This nail 1 comprises two legs 2, 3 having trunk portions 4 and 5 which have a semicircular section and flat heads 6 and 7 at one end thereof. A protrusion 8 is formed on the trunk portion 4 of the leg 2 near its tip. Initially, the legs 2 and 3 are bound together by a washer 9 so that the head 7 of the leg 3 is located offset from the head 6 of the leg 2 and the flat opposed surfaces are in close contact with each other with the tip of the leg 3 not overlying the protrusion 8.

To fasten an object B to a concrete wall A using the nail 1, a starting hole is formed in the wall A, and with the nail inserted through the object B into the starting hole until the washer 9 abuts the object B, the leg 3 is driven in by striking its head 7. As the leg 3 is driven in, it is bent or spread while riding onto the protrusion 8 as shown in FIG. 4B. Once driven in as shown, the legs 2, 3 will spread and be rigidly retained in the wall with the object B fastened to the wall by the heads 6 and 7. If the wall is made of ALC, the nail 1 can be driven into the wall directly without forming a starting hole to fasten an object to the wall.

Heretofore, in order to provide the protrusion 8, both legs 2 and 3 were formed by casting in molds, or the leg 2 was formed by partially cutting a rod having a circular section to form the protrusion 8.

Casting requires expensive molds and a facility for melting a metal material. Thus casting is expensive, inefficient and low in mass-productivity.

On the other hand, when the leg 2 is formed by cutting out a round rod, loss of material will be a major problem because the cut-out portion has to be discarded. Cutting a material is troublesome and time-consuming.

An object of this invention is to provide a nail which can be manufactured at low cost without loss of material.

SUMMARY OF THE INVENTION

According to the present invention, there is provided a nail comprising two legs bound together by a washer, one of the legs having a protrusion such that when the other leg is driven, it will spread by riding on the protrusion, the one leg having a tip portion at one end thereof, a head at the other end thereof, and a semicircular trunk portion, the protrusion being disposed between the tip portion and the trunk portion.

Other features and objects of the present invention will become apparent from the following description made with reference to the accompanying drawings, in which:

BRIEF DESCRIPTION OF THE DRAWINGS

Other features and objects of the present invention will become apparent from the following description made with reference to the accompanying drawings, in which;

FIGS. 1A, 1B, 1C and 1D are a front view, a side view, a back view and a perspective view of a nail of a first embodiment, respectively;

FIGS. 2A and 2B are partial enlarged side and front views of the nail of FIG. 1;

FIG. 2C is a partial perspective view of a rod stock from which one of the legs of the nail of FIG. 1 is formed and of the leg thus formed;

FIGS. 2D and 2E are sectional views of the protrusion of the nail of FIG. 1;

FIG. 3A is a perspective view of a nail of a third embodiment;

FIG. 3B is a front view of a nail stock from which one of the legs of the nail of FIG. 3A is formed and of the leg thus formed;

FIGS. 3C and 3D are front and side views of the nail of FIG. 3A;

FIG. 4A is a sectional view showing how a conventional nail is driven into a wall; and FIG. 4B is a perspective view of the same with the legs spread.

DETAILED DESCRIPTION OF THE PREFERRED EMBODIMENT

The nails 11 according to the present invention include two legs 12, 13 having trunk portions 14 and 15 having a semicircular section, and heads 16 and 17 having opposed flat surfaces flush with the flat opposed surfaces of the trunk portions 14, 15. The legs 12, 13 have tips 18, 19 at the other end. The leg 12 has a protrusion 20 on the flat surface of the trunk portion 14.

Initially, the legs 12 and 13 are bound together by a washer 21 so that the head 17 of the leg 13 is located above the head 16 of the leg 12 and the flat opposed surfaces are in close contact with each other with the tip of the leg 13 not overlying the protrusion 20.

The tips 18, 19 of the legs 12, 13 may be flat surfaces perpendicular to or inclined relative to the longitudinal direction of the trunk portions 14, 15, or pointed. The position of the washer 21 is not limited so long as it is slidable relative to the legs 12, 13. Two washers may be used instead of one.

FIGS. 1(A)-(D) and 2(A)-(E) show the first embodiment. The legs 12 and 13 of this embodiment are formed by pressing round metal rods R as shown in FIG. 2C.

Specifically, the leg 12 is formed by setting a round metal rod cut to a predetermined length in a press mold and forming the trunk portion 14, tip 18 and head 16 by pressing the rod except a portion where the protrusion 20 is to be formed. The protrusion 20 is formed by pressing the portion between the tip 18 and the trunk portion 14 from both sides (as shown by arrows in FIG. 2D) to increase the height H (FIG. 2E) of this portion and then forming a tapered surface 20b sloping downward from a peak 20a of the protrusion 20 toward the flat surface of the trunk portion 14 and tapered surfaces 20C at both sides by pressing.

In FIG. 2E, $d2 \leq H$ wherein d2 is the width of the peak portion 20a and H is its height.

In FIG. 2D, $d2 < d1$ wherein d2 is the width of the portion 2a and d1 is that of the trunk portion 14.

The leg 13 is formed by setting a metal rod R cut to a predetermined length in a press mold and forming the trunk portion 15, tip 19 and head 17 by pressing the rod.

The tip 19 may be inclined or arcuate instead of perpendicular to the longitudinal direction.

The height H is the distance between the circular bottom of the trunk portion 14 and the peak 20a of the protrusion 20. In order to form a semicircular trunk portion 14 having a diameter of 6 mm, a round rod having a diameter of 4.24 to 4.26 mm is used. The height H will be greater than 4.26 mm by pressing the portion corresponding to the protrusion 20 from both sides.

In the second embodiment, not shown, the legs 12 and 13 are formed from rods having a semicircular section. Thus, in this embodiment, the heads, tips and the protrusion 20 are formed by pressing while the trunk portions 14, 15 are not pressed. The protrusion 20 can be formed in the same manner as in the first embodiment.

FIGS. 3(A)-(D) shows the third embodiment in which the leg 12 is formed from a nail 34 having a round shank 31 having a tip 32 at one end and a head 33 at the other end (FIG. 3B) by pressing the shank 31, except its portion near the tip 32 to form a trunk portion 14 having a semicircular section, the tip 32 to form a tip 18, and the head 33 to form a head 16. The unpressed portion of the shank 31 is the protrusion 20. It has a height equal to the original diameter of the shank 31 because it is not pressed at this portion.

The leg 13 may be formed by pressing a nail similar to the one used to form the leg 12 of this embodiment or formed in the manner described in the first or second embodiment.

The nails of any embodiments are used in exactly the same manner as the conventional nail shown in FIG. 4B to fasten an object to a concrete wall.

A starting hole is formed in the wall A, and with the nail 11 inserted through the object B into the starting hole until the washer 21 abuts the object B, the leg 13 is driven in. As the leg 13 is driven in, it is bent or spread while riding onto the protrusion 20. Once driven in, the legs 12, 13 will spread and be rigidly retained in the wall with the object B fastened to the wall by the heads 16, and 17.

Since the nail of this invention is formed by pressing, it can be formed efficiently at a low facility cost without a loss of material. It is thus possible to produce high-quality nails at a low cost.

Since the protrusion is formed by pressing a part of the material from both sides thereof, its height can be easily increased. The higher the protrusion, the more prominently the legs will spread in the wall and thus, the larger the resistance to pulling forces.

What is claimed:

1. A method of manufacturing a nail comprising two legs bound together by a washer, one of said two legs having a protrusion such that when the other of said two legs is driven, said other of said two legs will spread by riding on said protrusion, said method comprising:

pressing a round rod stock except a portion thereof, to form a head at one end of said round rock stock, a trunk portion having a semicircular section with a flat surface, and a tip portion at the other end of said round rod stock; and forming said portion into said protrusion, thereby forming said one of said two legs.

2. The method as claimed in claim 1, wherein said portion is pressed from both sides to form said protrusion protruding from the flat surface of said truck portion.

3. The method as claimed in claim 1, wherein said protrusion has a height equal to or larger than its width.

4. The method as claimed in claim 1, wherein said trunk portion has a width larger than a width of said protrusion.

5. The method as claimed in claim 1, wherein said protrusion has tapered surfaces at both sides thereof.

6. A nail manufactured by the method as claimed in claim 1.

7. The method as claimed in claim 2, wherein said protrusion has a height equal to or larger than its width.

8. The method as claimed in claim 2, wherein said trunk portion has a width larger than a width of said protrusion.

9. The method as claimed in claim 2, wherein said protrusion has tapered surfaces at both sides thereof.

10. The method as claimed in claim 3, wherein said trunk portion has a width larger than the width of said protrusion.

11. The method as claimed in claim 3, wherein said protrusion has tapered surfaces at both sides thereof.

12. The method as claimed in claim 4, wherein said protrusion has tapered surfaces at both sides thereof.

13. A method of manufacturing a nail comprising two legs bound together by a washer, one of said two legs having a protrusion such that when the other of said two legs is driven, said other of said two legs will spread by riding on said protrusion, said method comprising:

pressing a nail stock having a round shank with a tip at one end thereof and a head at the other end thereof, except a portion of said nail stock near said tip, to form a trunk portion having a semicircular section, said head into a head portion, and said tip into a tip portion; and forming said portion near said tip into said protrusion, thereby forming said one of said two legs.

14. The method as claimed in claim 13, wherein said portion near said tip is pressed from both sides to form said protrusion protruding from a flat surface of said trunk portion.

15. The method as claimed in claim 13, wherein said protrusion has a height equal to or larger than its width.

16. The method as claimed in claim 13, wherein said trunk portion has a width larger than a width of said protrusion.

17. The method as claimed in claim 13, wherein said protrusion has tapered surfaces at both sides thereof.

18. A nail manufactured by the method as claimed in claim 13.

19. A method of manufacturing a nail comprising two legs bound together by a washer, one of said two legs having a protrusion such that when the other of said two legs is driven, said other of said two legs will spread by riding on said protrusion, said method comprising pressing a semicircular rod stock, except a portion thereof, to form a head at one end of said semicircular rod stock, a tip portion at the other end of said semicircular rod stock, and said protrusion between said portion and said tip portion.

20. The method as claimed in claim 19, wherein said protrusion has a height equal to or larger than its width.

21. The method as claimed in claim 19, wherein said trunk portion has a width larger than a width of said protrusion.

22. The method as claimed in claim 19, wherein said protrusion has tapered surfaces at both sides thereof.

23. A nail manufactured by the method as claimed in claim 19.

* * * * *